Figure 1:
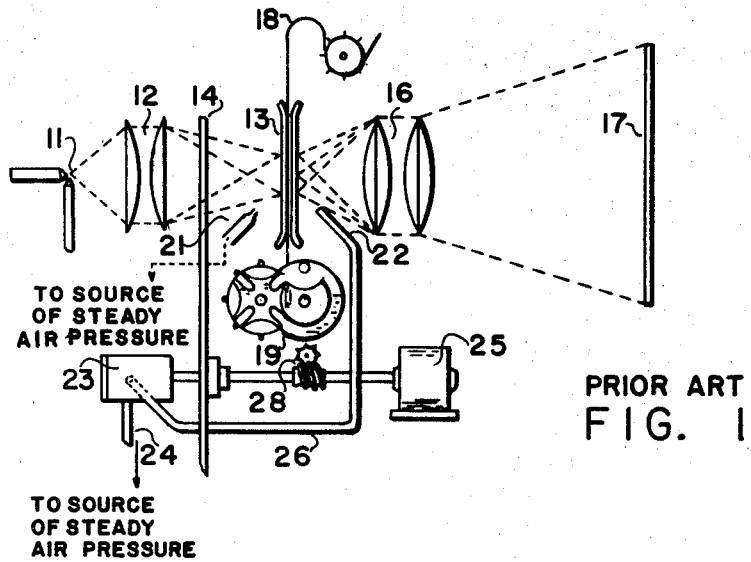

United States Patent

[11] 3,632,194

[72] Inventor: Walter E. Myles, Alexandria, Va.
[21] Appl. No.: 888,282
[22] Filed: Dec. 29, 1969
[45] Patented: Jan. 4, 1972
[73] Assignee: Singer-General Precision, Inc., Binghamton, N.Y.

[54] MOTION PICTURE PROJECTOR
6 Claims, 2 Drawing Figs.

[52] U.S. Cl. .................................................. 352/200
[51] Int. Cl. ................................................ G03b 21/00
[50] Field of Search .................................. 352/200, 187, 173

[56] References Cited

UNITED STATES PATENTS

| | | | |
|---|---|---|---|
| 2,496,102 | 1/1950 | McCord | 352/200 X |
| 2,995,064 | 8/1961 | Beese et al. | 352/200 |
| 3,268,287 | 8/1966 | Nemeth | 352/187 |
| 3,351,951 | 11/1967 | Perry | 352/200 X |

Primary Examiner—Donald O. Woodiel
Attorneys—Francis L. Masselle and William Grobman ABSTRACT: Variable speed flickerless motion picture projectors have many uses. This invention comprises a variable speed flickerless motion picture projector which uses a stepping motor to drive the film and a pulsed light source instead of a mechanical shutter and fixed light source. A computer or other programmed system controls the operation of the motor and light source.

INVENTOR.
WALTER E. MYLES

MOTION PICTURE PROJECTOR

This invention relates to motion picture projectors, and more particularly, to motion picture projectors which are variable in their speeds of operation and which are flickerless.

Although many projectors have been called variable speed, and many projectors have been called flickerless, very few have been successfully used to simulate visual environments with accuracy. Flickerless projectors are used in those situations where the flicker which is produced by the interruption of the projected image onto the screen is not tolerable. Variable speed projectors are used where changes in the speed of projection is desired.

If a motion picture projector is used for entertainment, it only need be fixed speed. These projectors can readily be made flickerless by having the shutter operate at twice the frame rate. In other words, if the shutter opens and closes twice during the time interval that a picture frame is in the film gate, the projector should be virtually flickerless at normal frame rates. However, when a variable speed projector is used, then the projection may not be flickerless at the lower film speeds or frame rates. In visual systems which are used in simulators to duplicate environments, fidelity of reproduction is important, and a flicker can be both annoying and distracting. In addition, where the projector is used to project images which are to move at controllable varying speeds, a projector having a wide range of film speeds and which moves smoothly from one such speed to another is important. Unfortunately, such a projector has not been available heretofore. All present projectors suffer from one or more of the above discussed disadvantages.

It is, therefore, an object of this invention to provide a new and improved motion picture projector.

It is another object of this invention to provide a new and improved motion picture projector which is flickerless.

It is a further object of this invention to provide a new and improved motion picture projector which is smoothly variable in its operating speed.

It is still another object of this invention to provide a new and improved motion picture projector which is flickerless and which provides smoothly variable operating speeds.

It is still a further object of this invention to provide a new and improved motion picture projector which is suitable for use in simulation equipment.

Figure 2:
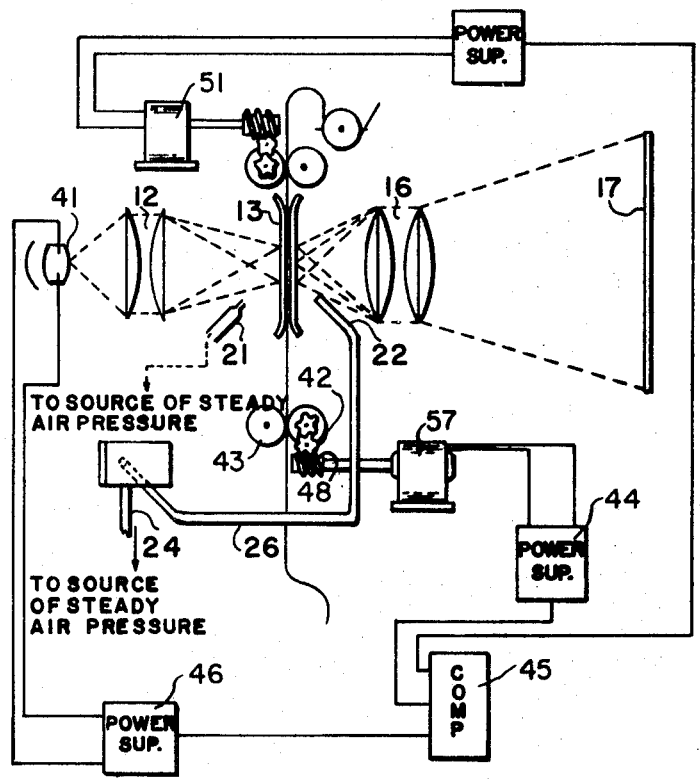

Other objects and advantages of this invention will become more apparent as the following description proceeds, which description should be considered together with the accompanying drawings in which:

FIG. 1 is a schematic showing of a portion of the operating mechanism of a prior art projector, and FIG. 2 is a schematic showing of a portion of the operating mechanism of a projector according to this invention.

Referring now to the drawings in detail, and more particularly to FIG. 1, the reference character 11 designates a pair of carbons defining an electric arc which is used to generate the light for the projector. A pair of condenser lenses 12 serves to focus the light from the arc 11 onto the plane of a film transparency 18 which is supported in a film gate 13. The light from the arc 11 passes through the film 18 and is focused by the projection lens 16 onto a projection screen 17. Movement of the film 18 is intermittent, and the intermittent motion is produced by any suitable mechanism such as the Geneva gear arrangement generally designated 19. The Geneva gear arrangement is driven by a motor 25 through a worm 28. Also driven by the motor 25 is a rotating shutter 14 which comprises a opaque disc having at least two openings therethrough at opposite sides of a diameter. The timing is such that the film 18 is advanced one frame during the time the opaque portion of the shutter interrupts the light. A source of steady air pressure is applied to a nozzle 21 which directs the air onto the film in the gate 13 to cool the film and prevent its burning. In addition, the source of steady air pressure is also applied to a container 23 which contains a valve driven by the motor 25 so that each time the film 18 comes to rest, a pulse of air is directed through the tube 26 to the screen side of the film 18 in the gate 19. This prevents the film 18 from buckling outwardly toward the screen 17 and moving out of focus. However, the valve could be eliminated so that steady air is applied to the film 18 by both nozzles 21 and 22.

In general, the shutter 14 completes one revolution during the time that a picture frame is in the gate 13. The Geneva drive 19 is so constructed that a wheel-carrying sprocket pins which pass through the sprocket holes in the film 18 is rotated rapidly for a very short interval of time, and then comes to rest for a longer interval of time. This moves the film 18 so that one frame is moved out of the gate 13 and the next succeeding frame is moved into the gate 13 during an early portion of the shutter revolution while an opaque portion is opposite the gate 13. A standard claw and pin arrangement can be used instead of the Geneva movement which is shown for convenience. Both types of intermittent movement are well known in the motion picture projector art. Assuming, as mentioned above, that the shutter 14 contains two transparent portions which are diametrically opposed, the light passing through any frame in the film 18 is interrupted twice. If the projector is a normal, fixed speed projector used in the entertainment field, the film speed is about 24 frames per second, and the light passing through the film 18 is interrupted 48 times per second. It is a characteristic of the human eye that rapid flashes are integrated and appear to be uninterrupted. The faster the flashes occur, the less flicker there appears to be. Therefore, although the film frames change at the rate of 24 per second, doubling the number of shutter interruptions renders the projector flickerless. However, doubling the number of interruptions also means that the time available for moving the film is cut in half, since the film can be moved only when the light is interrupted. This is most important in variable speed projectors in which film speeds of 40 frames per second are not uncommon. This means that the film must be moved from one frame to the next in approximately 1/160 of a second. Apparently the acceleration rates required for this speed of movement are not so high that the sprocket holes are damaged, but the rapid acceleration rates do wear the film to a much greater extent than would be assumed merely from the increased speed. However, the variable speed projectors presently available are not smoothly variable over a range of speeds from zero frames per second to a maximum number of frames per second. Usually, the variable speed projectors vary their rates of film movement in steps so that there is often a jump as the projector shifts from one speed to the next. Since the range of motor speeds from a single motor is limited, gears may be used, or two variable speed motors having different base speeds may be used. In either case, the sudden change in the speed of the film movement does nothing to provide plausible simulation.

Thus, considering the system shown in FIG. 1, the single motor 25 drives both the film 18 and the shutter 14. As the rotational speed of the motor 24 is increased, the loads on the motor 25 increase nonlinearly. This means that a large motor must be used to ensure adequate operation at higher speeds. In addition, as the loading on the motor 25 increases, the ability of the motor to maintain a fixed speed whenever the film is to be moved drops. If the speed of the motor 25 drops to very low value, the flicker becomes objectionable and the film in the gate 19 is exposed to the radiation from the arc 11 for a longer time interval and is subject to more rapid heating, aging, and color change due to the heat from the arc.

In the device of FIG. 2, most of the above mentioned disadvantages have been eliminated. A gas-filled arc light 41 has been substituted for the carbon arc light 11 of FIG. 1. The light from the lamp 41 is reflected by a mirror for greater efficiency and passes through the condenser lens system 12 and the film gate 13. As in FIG. 1, the light from the lamp 41 passes through the frame of the film 18 which is in the film gate 13 and is projected through the lens system 16 onto the projection screen 17. The image contained on the frame of the film 18 which is in the gate 13 is also projected onto the screen 17. The tube 26 is connected to a source of air pressure on one side and to the nozzle 22 on the other side, as in the system of FIG. 1, and the nozzle 21 can be connected to a source of air pressure, also, to provide the film 18 with cooling-air currents. However, the motor 57 is a stepping motor rather than a continually running motor. A stepping motor is one which will, upon the application of a suitable pulse of electrical energy, step a fixed amount with acceleration characteristics which will not damage the film 18. The motor then rests until the next pulse of energy is applied and it again steps the fixed amount. The motor 57 is energized from a source of electrical energy or power supply 44 which is connected by a signal line to a computer 45 or other programable source of signal pulses. The motor 57 has a worm 48 mounted on its shaft, and a roller 42 is driven by the worm 48. A mating idler roller 43 resiliently presses the film 18 between itself and the roller 42 so that as the roller 42 is driven, it drives the film 18. In addition, the computer 45 supplies signal pulses to a second power supply 46 which supplies electrical pulses to the arc lamp 41. A second drive motor 51 driving a second pair of rollers 52 and 54 through a worm 53 is energized by power supply 55 and is connected through a signal line 56 to the computer 45. The motor 51 is used for driving the film 18 in reverse if desired. Omitted from the drawing are such normally supplied devices as electrically controlled clutches in the drive train of the two motors 51 and 57. The clutches are used so that only one motor can drive the film at a time. If reverse drive is desired, then the clutch connecting the motor 51 to the film drive is engaged; if forward drive is required, then the clutch connecting motor 57 to the film drive is engaged. Also not shown is an alternative drive arrangement where only one motor but two drive trains, one forward and the other reverse are used, and can be connected to the single motor by suitably controllable clutches. Since these drive systems are old and well known, only the simple arrangement of the two motors 51 and 57 is shown as exemplary.

As indicated above, the variable speeds on present-day projectors are too often sudden, stepped changes in speed rather than smoothly variable speeds over a wide range. In addition, the shutter is slowed at the slower frame speeds and the flickerless feature is lost, or if the shutter speed is maintained as the film speed is varied, then the synchronization of the shutter and the film is aggravated leading to still further sudden variations in operation. In the system shown in FIG. 2, the film is moved wheneven the motor—for this example consider motor 57 only—is energized. The gearing through the worm 48 and the worm gear should be such that if the motor 57 is a single-rotation motor, that is rotated 1 revolution each time it is pulsed, then 1 revolution of the motor 57 moves the film 18 one frame. Accurate positioning of the film 18 can more readily be achieved if registration pins are used as they are presently used in claw movements for film projectors. The pins will ensure the proper position of each frame in the gate 13. At the same time that the motor 57 is energized, the lamp 41 must not be energized. Thus, the film is moved only when the lamp 41 is dark. Since the entire operation is under control of a single control system such as the computer 45, this readily can be achieved. The computer 45 signals the motor 57 to step the film. Then, at a later time when the film is at rest, and this can be determined by the time when the registration pins are inserted through the sprocket holes in the film, the lamp 41 is pulsed. The light emitted by the lamp 41 can be intense since the duty cycle is small. In fact, if desired, the light output of the lamp can be varied over a limited range of intensities by making the pulse applied to the lamp 41 of very small duration. Then, a number of pulses can be applied to the lamp 41 during the time that the film 18 is stationary, in effect extending the length of time that the lamp 41 is lit. The length of time that the lamp is pulsed may extend, for a single-film frame, from the length of time of a single electrical pulse to virtually the total time between frames. The integrated light that is projected through any frame onto the screen 17 is then varied over a wide range. In addition, since no Geneva gearing, claw mechanism, or similar film moving means which penetrates the film sprocket holes is used, the motor 57 can be driven from the computer 45 at essentially constant rotation. The film gate 13 should be fairly loose for this type of operation and the registration pins must be withdrawn, but the film can, in effect, flow through the gate 13. When this is the case, the flashing of the light 41 determines, in effect, the rate at which the film frames are projected. If higher frame projection speeds than normally convenient are desired, the film can be made to flow through the gate 13, and the lamp 41 can be flashed once for each two frames, giving the effect of twice the actual speed. When the film 18 flows through the gate 13, the registration pins are not used since they would tear the film 18, and the synchronization of the film and the light 41 must be controlled in other ways. One such way in which such synchronization is achieved is by using the film itself to flash the light 41. In this case, the edge of the film normally reserved for sound recording can contain control marks, and the sound-reading system on the projector is used to translate the control marks on the film into control pulses for the power supply 46. Should double speed be desired, the control of the lamp 41 would be through the computer 45 which would use only every other pulse.

It is important for a motion picture projector which is used in the simulation of complex machines, for example a device which simulates the operation of a railroad engine, to be able to operate realistically throughout the entire range of operation of the device it simulates. Considering the railroad engine, the apparatus which produces the visual simulation must be able to represent an engine in all of its operating speeds from at rest to its maximum speed. If the motion picture which is used in the projector is made with the engine moving along the track at, say, 40 miles per hour, then the simulator will simulate the train moving at 40 miles per hour when the projector is operating at the same frame rate that the camera which made the film operated. For higher speeds, the projector must operate faster, and for lower speeds the projector must slow down. To provide realistic simulation, the projector must be able to represent the scene for the trainee as the train starts up from a rest condition and as it gradually achieves higher speeds and do this smoothly. Since the train increases its speed smoothly, the projector must increase its speed smoothly. The operation of the stepping motor and its synchronization with the flashing of the lamp 41 without the intervention of a mechanical shutter achieves this goal. Since, at the higher rates of speed, the time that the light from the lamp 41 exists may decrease, the ability to increase the number of light flashes per frame can compensate for any dimming of the picture to maintain the light level constant and to provide additional means for modifying the light level. If desired, to assure constant light levels even when different films are used, the control of the number of times that the lamp 41 flashes per frame can be controlled, in part, by a photosensitive device which monitors the light level on the screen 17.

With the projector of this invention and a specially prepared print of the film, a stereoscopic effect can be achieved. Using two cameras operating simultaneously, the same scene is photographed. The print, however, is a composite print which comprises one frame of one picture and one frame of the other picture interlaced. Thus, everyother frame is from the same camera. The computer or other control device can then operate the projector to project onto the screen 17 everyother frame so that a single picture made with a single camera is projected onto the screen, or all of the frames can be projected. If all of the frames are projected, a polarizing member must be interjected before the screen 17 for everyother frame, and the observer should wear polarized glasses. In this manner, the two eyes of the observer can be made to respond differently to the two images appearing on the screen in succession. This will produce a three-dimensional effect.

The above specification has described a new and improved projector for motion pictures, which projector is very versatile and has great utility, particularly in the simulation of changing scenes. It is realized that the above description may indicate to others in the art additional ways in which the principles of this invention may be used without departing from its spirit, and it is, therefore, intended that this invention be limited only by the scope of the appended claims.

What is claimed is:

1. A variable speed motion picture projector system comprising a film gate adapted to contain a strip of motion picture film for intermittent movement therethrough, means for feeding said film strip to said gate and for retrieving it from said gate, a controllable intermittent source of light, said source emitting light when it is energized, means for intermittently energizing said source of light under the control of an external means, a stepping motor connected to said film feed to drive said film feed when said motor is energized, means for intermittently energizing said motor to move said film through said gate at selectable speeds one frame at a time, and means for controlling the energization of said source of light to energize said source only when said film is stationary in said gate.

2. The projector system defined in claim 1 wherein the speed of said motor is controlled by the rate at which said motor is energized, said means for energizing said motor applying pulses to said motor to produce operation thereof, and means for controlling the rate at which said motor energization means applies pulses to said motor to control the speed of operation thereof and the speed at which the film is moved through the gate.

3. A variable speed motion picture projector system which compensates for differences in speed by controlling the energization of its projection light, said system comprising a film gate through which motion picture film is adapted to be moved, a film transport means including a pulsed intermittently operating motor first means for applying energization pulses to said motor, a pulsed source of light, second means for applying energization pulses to said source of light, and means for controlling the timing and the rate at which said first and second means apply energization pulses to said motor and said source of light to control the speed of movement of said film through said gate and the time interval during which any frame of said film is illuminated from said source.

4. The system defined in claim 3 wherein the speed of movement of said film through said gate—the frame rate—is proportional to the rate at which energization pulses are applied to said motor by said first means.

5. The system defined in claim 4 wherein the rate at which said film is illuminated is controlled by the rate at which said second means applies pulses to said source of light, and wherein the amount of light by which each frame of said film is illuminated is controlled by the length of time that said source is energized each time it is energized, the rate of energization of said source being at least sufficient to ensure that the operation of said projector appear to the human eye to be flickerless.

6. The projector defined in claim 4 wherein said control means further determines the time duration and rate at which pulses are applied by said second means to said source of light, and wherein said control means synchronizes the movement of the film which the energization of said source of light throughout the range of speeds at which said film is driven through said gate.

* * * * *